US010803896B1

(12) United States Patent
Mohl

(10) Patent No.: US 10,803,896 B1
(45) Date of Patent: Oct. 13, 2020

(54) DATA STORAGE DEVICE USING SINGLE-LAYER MULTI-LEVEL MAGNETIC RECORDING

(71) Applicant: Western Digital Technologies, Inc., San Jose, CA (US)

(72) Inventor: Aaron K. Mohl, Arvada, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/743,827

(22) Filed: Jan. 15, 2020

(51) Int. Cl.
*G11B 11/105* (2006.01)
*G11B 5/68* (2006.01)
*G11B 5/09* (2006.01)
*G11B 5/00* (2006.01)
*G11B 5/62* (2006.01)

(52) U.S. Cl.
CPC .................. *G11B 5/68* (2013.01); *G11B 5/09* (2013.01); *G11B 5/62* (2013.01); *G11B 2005/0018* (2013.01); *G11B 2005/0021* (2013.01); *G11B 2005/0024* (2013.01); *G11B 2005/0034* (2013.01)

(58) Field of Classification Search
None
See application file for complete search history.

(56) References Cited

U.S. PATENT DOCUMENTS

| | | | | |
|---|---|---|---|---|
| 5,359,579 A | * | 10/1994 | Karube | ............. G11B 11/10508 369/13.1 |
| 5,369,628 A | * | 11/1994 | Yoshimoto | ............ G11B 11/105 369/13.36 |
| 5,414,678 A | * | 5/1995 | Challener, IV | ... G11B 11/10515 369/13.5 |
| 5,508,982 A | * | 4/1996 | Challener, IV | ... G11B 11/10515 369/116 |
| 7,701,657 B2 | | 4/2010 | Lee | |
| 9,007,720 B2 | * | 4/2015 | Fukuzawa | ................ G11B 5/66 360/125.3 |
| 9,601,144 B1 | | 3/2017 | Mehta et al. | |
| 9,601,145 B1 | | 3/2017 | Grobis et al. | |
| 9,697,857 B1 | * | 7/2017 | Ahner | ...................... G11B 5/66 |
| 9,818,440 B1 | * | 11/2017 | Jubert | ..................... G11B 5/314 |
| 9,858,950 B1 | | 1/2018 | Bueck et al. | |
| 9,911,446 B1 | | 3/2018 | Ahner et al. | |
| 10,276,208 B1 | * | 4/2019 | Bai | ..................... G11B 20/1217 |
| 2010/0149676 A1 | | 6/2010 | Khizorev et al. | |
| 2014/0247520 A1 | | 9/2014 | Yang et al. | |

* cited by examiner

*Primary Examiner* — Tan X Dinh

(57) ABSTRACT

A data storage device is disclosed comprising a disk surface comprising a magnetic recording layer comprising a first magnetic material having a first coercivity intermixed with a second magnet material having a second coercivity higher than the first coercivity, and a head comprising a write coil configured to magnetize the magnetic recording layer in order to write data to the disk surface. The data is written to the disk surface by configuring the magnetic recording layer into one of at least three recording states, and the data is read from the disk surface by reading the magnetic recording layer using the head to generate a multi-level read signal, where each level of the read signal corresponds to one of the recording states.

21 Claims, 7 Drawing Sheets

DATA STORAGE DEVICE USING SINGLE-LAYER MULTI-LEVEL MAGNETIC RECORDING

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 1:
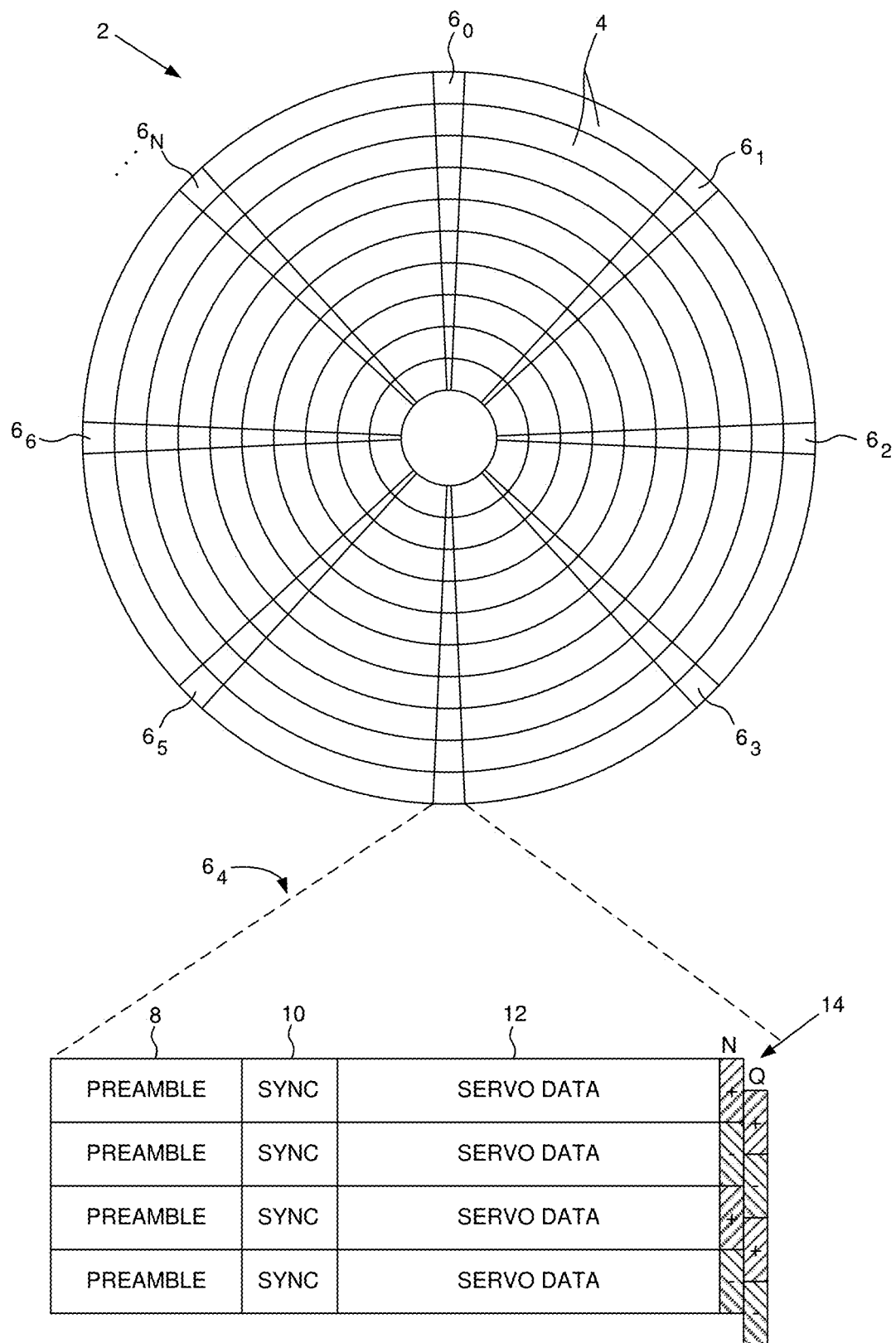
FIG. 1 shows a prior art disk format comprising a plurality of servo tracks defined by servo sectors.
Figure 2A:
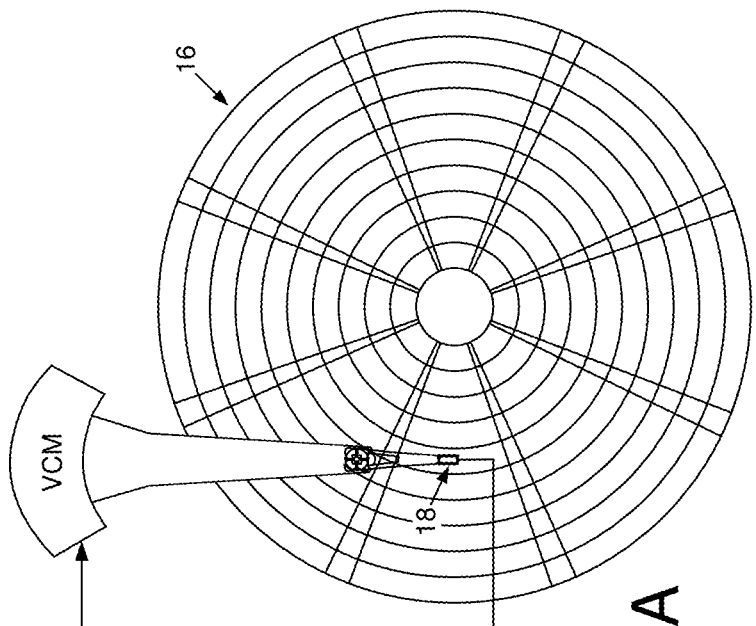
FIG. 2A shows a data storage device in the form of a disk drive according to an embodiment comprising a head actuated over a disk surface.
Figure 2C:
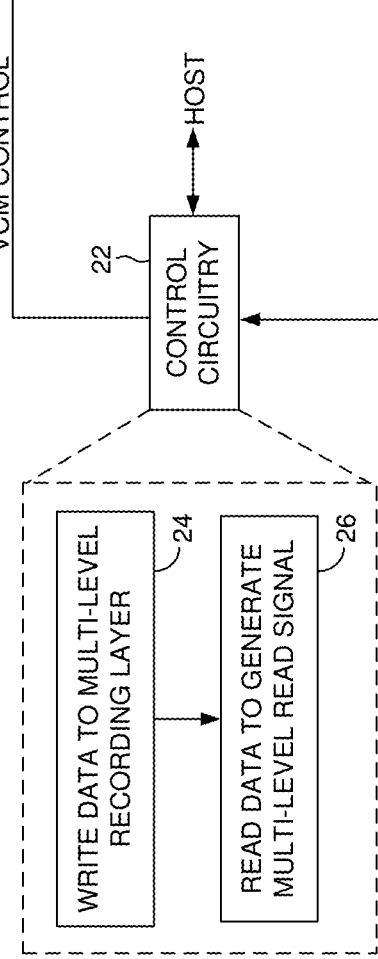
FIG. 2C is a flow diagram according to an embodiment wherein data is read from a multi-level recording layer to generate a multi-level read signal.
Figure 2B:
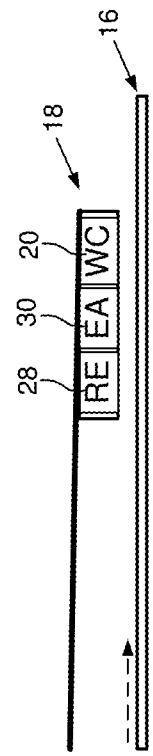
FIG. 2B shows an embodiment wherein the head comprises an energy assist component for generating an energy assist during write operations.

FIG. 2A shows a data storage device in the form of a disk drive according to an embodiment comprising a disk surface 16 comprising a magnetic recording layer comprising a first magnetic material having a first coercivity intermixed with a second magnet material having a second coercivity higher than the first coercivity. FIG. 2B shows an embodiment wherein a head 18 comprises a write coil 20 configured to magnetize the magnetic recording layer in order to write data to the disk surface 16. The disk drive further comprises control circuitry 22 configured to execute the flow diagram of FIG. 2C wherein data is written to the disk surface by configuring the magnetic recording layer into one of at least three recording states (block 24), and the data is read from the disk surface by reading the magnetic recording layer using the head to generate a multi-level read signal (block 26), where each level of the read signal corresponds to one of the recording states.

In the embodiment of FIG. 2B, the head 18 comprises a suitable read element 28, such as a magnetoresistive element, configured to sense a magnitude of magnetic flux emanating from the disk surface 16 due to the orientation of the magnetic grains within each bit cell. The head 18 further comprises a suitable energy assist element 30 that generates an energy assist during write operations. Examples of energy assist include heat assisted magnetic recording (HAMR) wherein a laser diode and near field transducer (NFT) heat the disk surface, or microwave assisted magnetic recording (MAMR) wherein a spin torque oscillator applies a high frequency auxiliary magnetic field to the media close to the resonant frequency of the magnetic grains.

Figure 3:
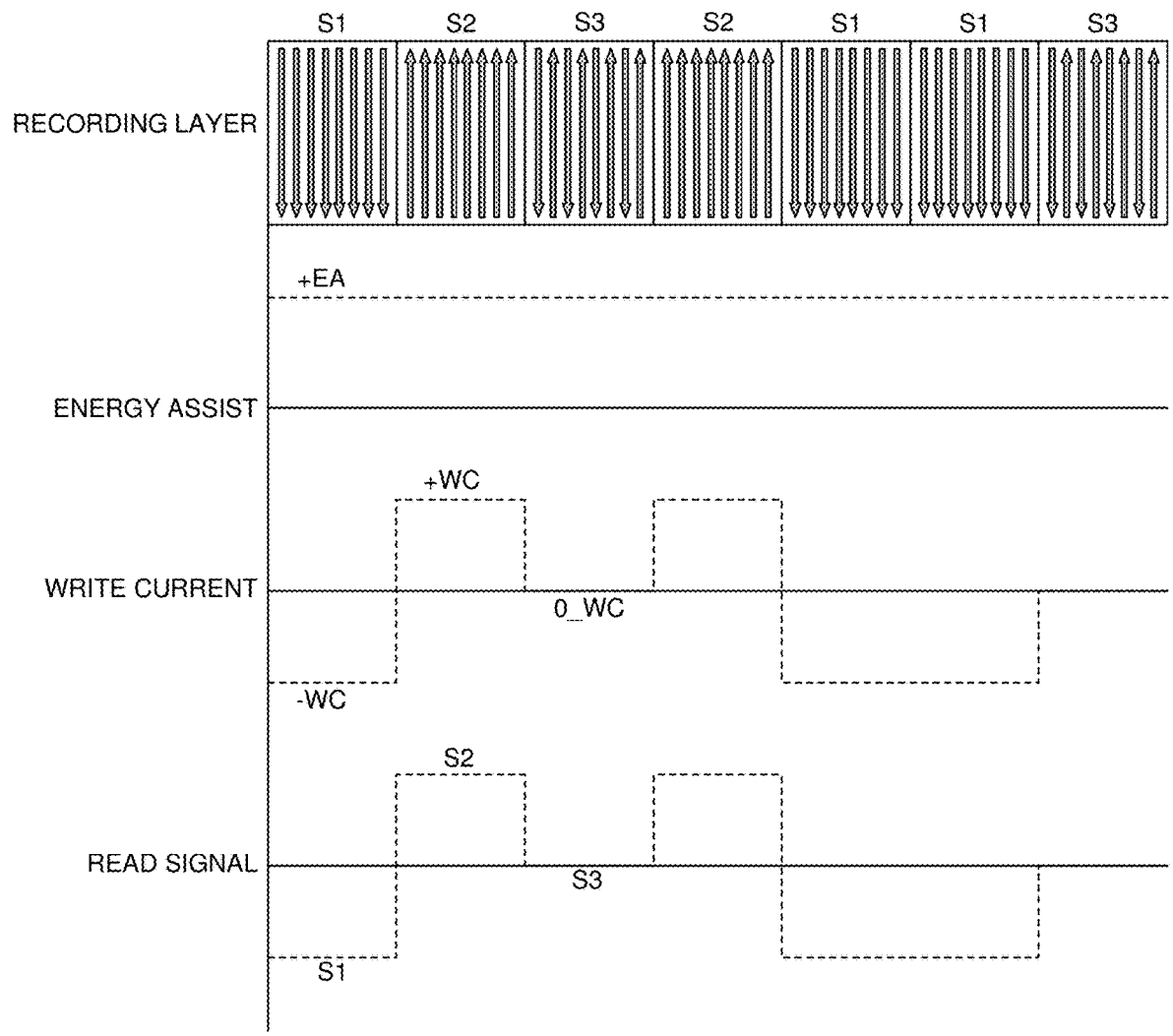
FIG. 3 shows an embodiment wherein the multi-level recording layer comprises a magnetic material magnetized into a positive or negative polarity by applying a non-zero energy assist and a non-zero write current, and into a neutral polarity by applying the non-zero energy assist and a zero write current.

FIG. 3 shows an embodiment wherein the magnetic recording layer of the disk surface 16 consists of a single magnetic material having magnetic grains that orient into a neutral polarity when applying a non-zero energy assist and a zero write current to the write coil. This embodiment takes advantage of the neutral polarity of the magnetic material to implement a ternary recording system wherein data is written to the disk surface by configuring the magnetic recording layer into one of a first recording state, a second recording state, or a third recording state. A non-zero energy assist is applied to the magnetic recording layer and a non-zero write current is applied to the write coil to configure the magnetic recording layer into the first recording state (S1) or the second recording state (S2). The non-zero energy assist is applied to the magnetic recording layer and a zero write current is applied to the write coil to configure the magnetic recording layer into the third recording state (S3).

In the example of FIG. 3, a bit cell of the magnetic recording layer is configured into the first recording state (S1) by applying a negative write current to the write coil in order to orient the magnetic grains into a negative polarity (represented by up arrows), and configured into the second recording state (S2) by applying a positive write current to the write coil in order to orient the magnetic grains into a positive polarity (represented by down arrows). When configured into the third recording state, the magnetic grains of a bit cell orient into a neutral polarity represented by a random pattern of up/down arrows. When reading the recorded data from the disk surface, the amplitude of the read signal corresponds to the polarity of the recording state, wherein the neutral recording state (S3) generates a substantially zero amplitude read signal. In one embodiment, the read signal may be demodulated into an estimated data sequence using a slicer having thresholds configured to detect the most likely recording state based on the amplitude of the read signal.

Figure 4:
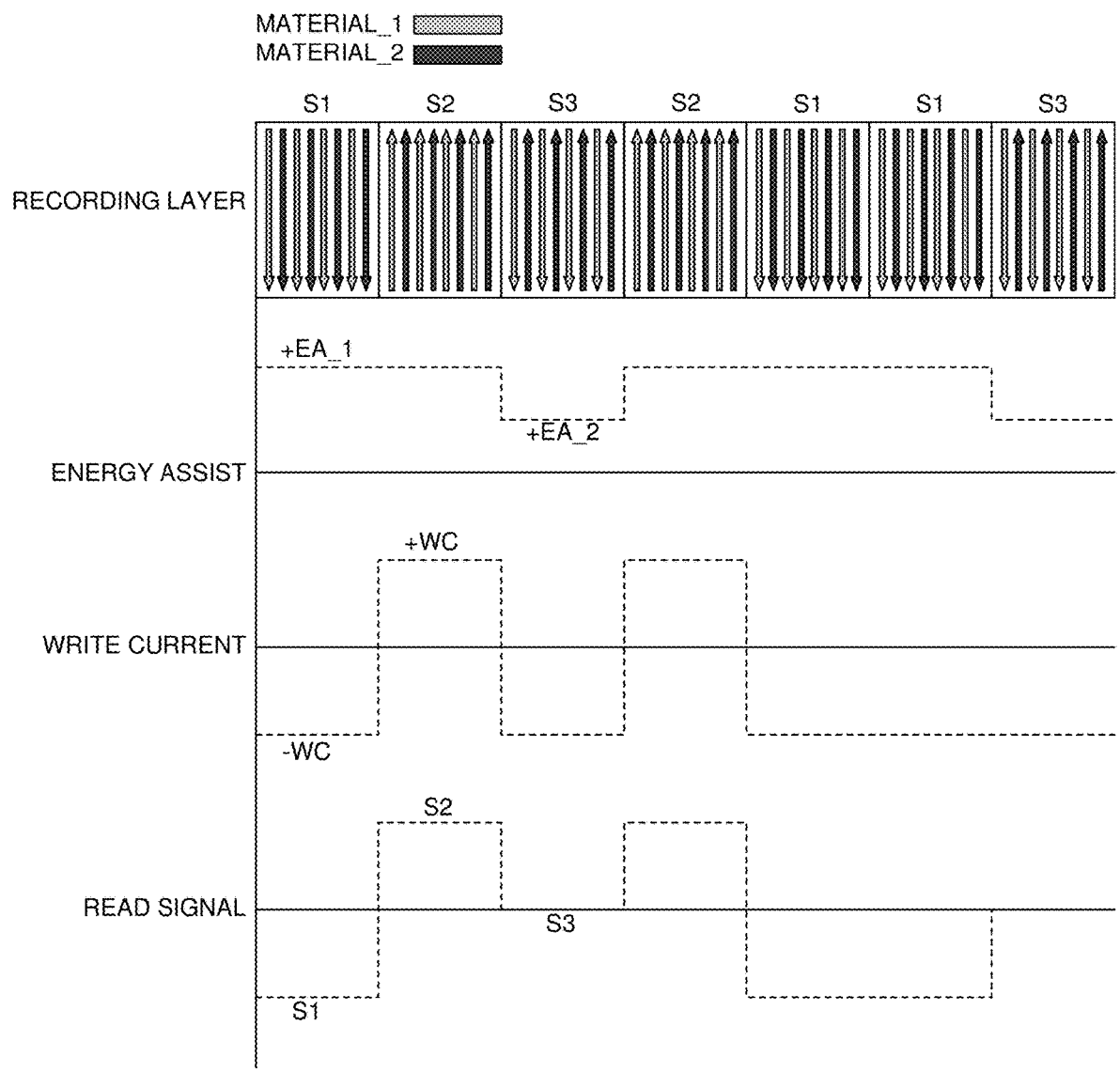
FIG. 4 shows an embodiment wherein the multi-level recording layer comprises a first magnetic material having a first coercivity, and a second magnetic material having a second coercivity higher than the first coercivity.

FIG. 4 shows an embodiment wherein the disk surface 16 comprising a magnetic recording layer consisting of a first magnetic material having a first coercivity intermixed with a second magnetic material having a second coercivity higher than the first coercivity. In one embodiment, the coercivity of the magnetic materials decreases when applying a non-zero energy assist to the disk surface. In this manner, the magnetic grains in each magnetic material may reach a saturation recording state (due to the magnetic field of the write coil) at different amplitudes of energy assist. In the example of FIG. 4, both the first and second magnetic materials may reach the saturation recording state when a first energy assist is applied the magnetic recording layer, and only the first magnetic material may reach the saturation recording state when a second, lower energy assist is applied to the disk surface. This embodiment takes advantage of the different coercivity of the first and second magnetic materials to implement a ternary recording system wherein data is written to the disk surface by configuring the magnetic recording layer into one of a first recording state, a second recording state, or a third recording state. A first non-zero energy assist is applied to the magnetic recording layer and a non-zero write current is applied to the write coil to configure a bit cell of the magnetic recording layer into the first recording state (S1) or the second recording state (S2). A second non-zero energy assist is applied to the magnetic recording layer and the non-zero write current is applied to the write coil to configure a bit cell of the magnetic recording layer into the third recording state (S3), wherein the second non-zero energy assist is less than the first non-zero energy assist.

In the example of FIG. 4, a bit cell of the magnetic recording layer may be erased by initially configuring the magnetic material of all the bit cells into the second recording state (S2). In one embodiment, a bit cell of the magnetic recording layer is configured into the first recording state (S1) by applying a negative write current to the write coil in order to orient the magnetic grains of both magnetic materials into a negative polarity (represented by down arrows), and configured into the second recording state (S2) by applying a positive write current to the write coil in order to orient the magnetic grains of both magnetic materials into a positive polarity (represented by up arrows). A bit cell of the magnetic recording layer is configured into the third recording state (S3) by reducing the energy assist such that only the first magnetic material is saturated by the magnetic field of the write coil while applying a negative write current to the write coil. In this manner, the magnetic grains of the first magnetic material orient into a negative polarity represented by down arrows while the magnet grains of the second magnetic material remain in the positive polarity (erased state) represented by up arrows. In one embodiment, the ratio of the first magnetic material to the second magnetic material is approximately 1:1 such that the net flux emanating from the magnetic recording layer when in configured into the third recording state is substantially zero. That is when reading the recorded data from the disk surface, the amplitude of the read signal corresponds to the polarity of the recording state, wherein the third recording state (S3) generates a substantially zero amplitude read signal.

Figure 5:
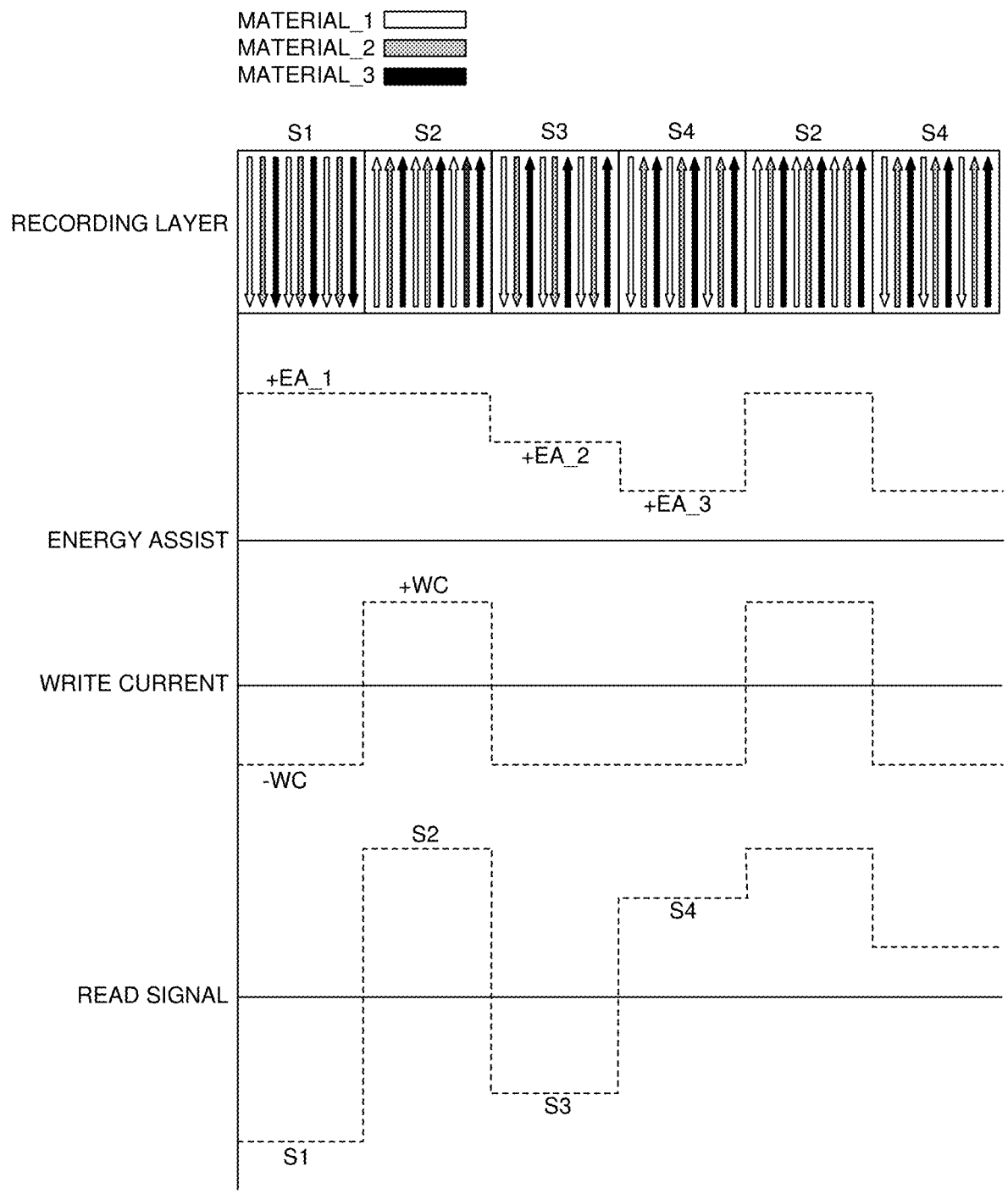
FIG. 5 shows an embodiment wherein the multi-level recording layer comprises three magnetic materials with a varying degree of coercivity.

FIG. 5 shows an embodiment wherein the disk surface 16 comprising a magnetic recording layer consisting of a first magnetic material having a first coercivity intermixed with a second magnet material having a second coercivity higher than the first coercivity and a third magnet material having a third coercivity higher than the second coercivity. In one embodiment, the coercivity of the magnetic materials decreases when applying a non-zero energy assist to the disk surface. In this manner, the magnetic grains in each magnetic material may reach a saturation recording state (due to the magnetic field of the write coil) at different amplitudes of energy assist. In the example of FIG. 5, the first, second and third magnetic materials may reach the saturation recording state when a first energy assist is applied to the magnetic recording layer, only the first and second magnetic materials may reach the saturation recording state when a second, lower energy assist is applied the magnetic recording layer, and only the first magnetic material may reach the saturation recording state when a third, yet lower energy assist is applied to the disk surface. This embodiment takes advantage of the different coercivity of the magnetic materials to implement a quaternary recording system wherein data is written to the disk surface by configuring the magnetic recording layer into one of a first recording state, a second recording state, a third recording state, or a fourth recording state. A first non-zero energy assist is applied to the magnetic recording layer and a non-zero write current is applied to the write coil to configure a bit cell of the magnetic recording layer into the first recording state (S1) or the second recording state (S2). A second non-zero energy assist is applied to the magnetic recording layer and the non-zero write current is applied to the write coil to configure a bit cell of the magnetic recording layer into the third recording state (S3), wherein the second non-zero energy assist is less than the first non-zero energy assist. A third non-zero energy assist is applied to the magnetic recording layer and the non-zero write current is applied to the write coil to configure a bit cell of the magnetic recording layer into the fourth recording state (S4), wherein the third non-zero energy assist is less than the second non-zero energy assist.

In the example of FIG. 5, the magnetic recording layer may be erased by initially configuring the magnetic material of all the bit cells into the second recording state (S2). In one embodiment, a bit cell of the magnetic recording layer is configured into the first recording state (S1) by applying a negative write current to the write coil in order to orient the magnetic grains of all three magnetic materials into a negative polarity (represented by down arrows), and configured into the second recording state (S2) by applying a positive write current to the write coil in order to orient the magnetic grains of all three magnetic materials into a positive polarity (represented by up arrows). A bit cell of the magnetic recording layer is configured into the third recording state (S3) by reducing the energy assist such that the first and second magnetic materials are saturated by the magnetic field of the write coil while applying a negative write current to the write coil. In this manner, magnetic grains of the first and second magnetic materials orient into a negative polarity represented by down arrows while the magnet grains of the third magnetic material remain in the positive polarity (erased state) represented by up arrows. A bit cell of the magnetic recording layer is configured into the fourth recording state (S4) by reducing the energy assist such that only the first magnetic material is saturated by the magnetic field of the write coil while applying a negative write current to the write coil. In this manner, magnetic grains of the first magnetic material orient into a negative polarity represented by down arrows while the magnet grains of the second and third magnetic materials remain in the positive polarity (erased state) represented by up arrows. In one embodiment, the magnetic recording layer is fabricated such that the volume of each magnetic material is approximately one-third of the total volume. In this manner, the amplitude of the read signal corresponding to the third recording state (S3) is two-thirds the amplitude of the first recording state (S1), and the amplitude of the read signal corresponding to the fourth recording state (S4) is two-thirds the amplitude of the second recording state (S2) as shown in FIG. 5. In another embodiment, the relative volume (ratios) of each magnetic material may be different than one-third each so that the amplitude of the read signal corresponding to each recording state are further separated from one another, and in one embodiment, such that there is a maximum separation in the read signal amplitude between each of the adjacent recording states.

Figure 6:
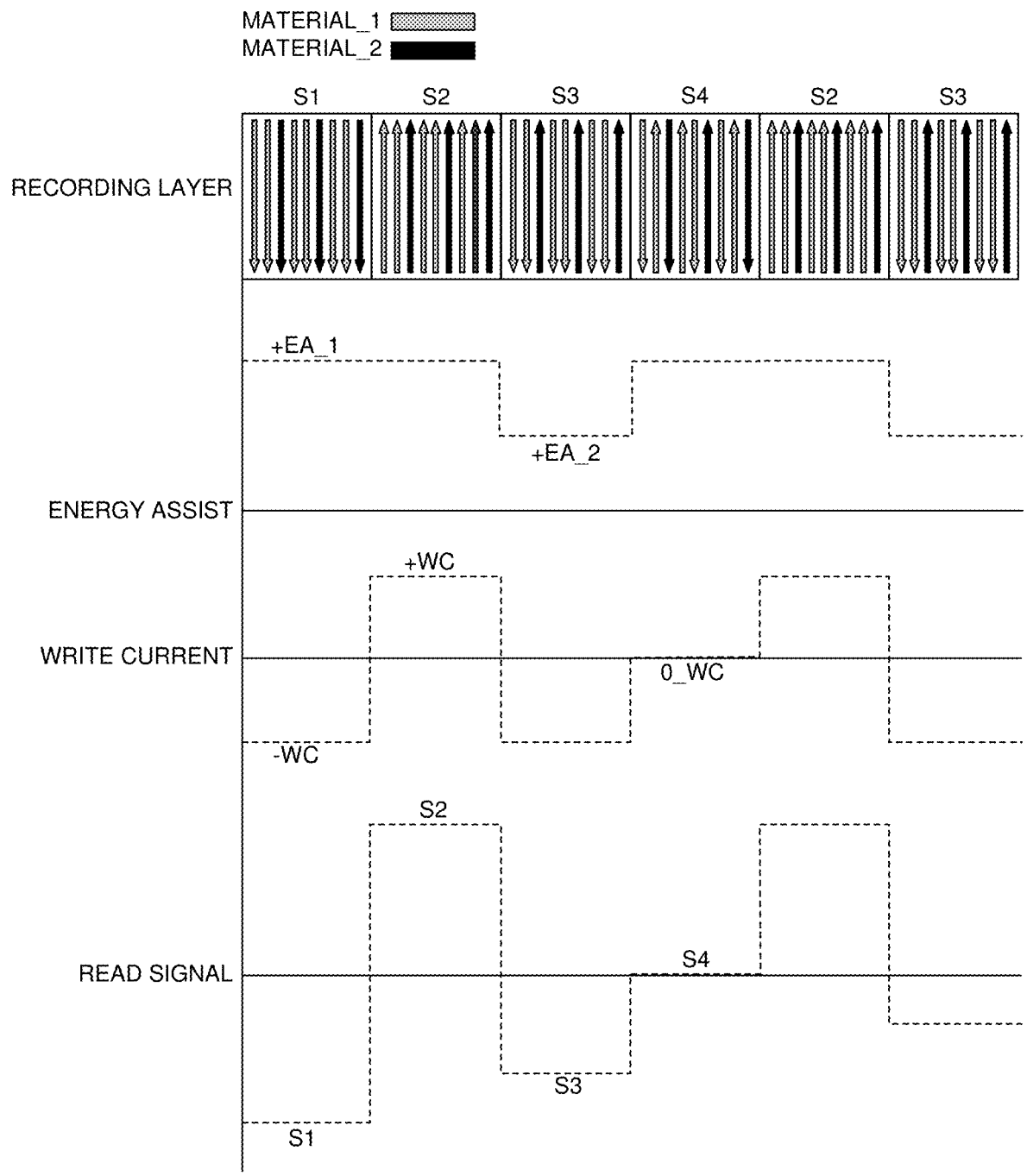
FIG. 6 shows an embodiment wherein the multi-level recording layer comprises two magnetic materials that are magnetized into a neutral polarity by applying a non-zero energy assist and a zero write current.

FIG. 6 shows an embodiment wherein the disk surface 16 comprising a magnetic recording layer consisting of a first magnetic material having a first coercivity intermixed with a second magnet material having a second coercivity higher than the first coercivity, wherein a ratio of the first magnetic material to the second magnetic material is within a range of 1.2:1 and 2:1. In one embodiment, the coercivity of the magnetic materials decreases when applying a non-zero energy assist to the disk surface. In this manner, the magnetic grains in each magnetic material may reach a saturation recording state (due to the magnetic field of the write coil) at different amplitudes of energy assist. In the example of FIG. 6, the first and second magnetic materials may reach the saturation recording state when a first energy assist is applied the magnetic recording layer, and only the first magnetic material may reach the saturation recording state when a second, lower energy assist is applied to the disk surface. This embodiment takes advantage of the different coercivity of the magnetic materials as well as a neutral polarity of the magnetic materials when applying a non-zero energy assist and a zero write current to implement a quaternary recording system wherein data is written to the disk surface by configuring the magnetic recording layer into one of a first recording state, a second recording state, a third recording state, or a fourth recording state. A first non-zero energy assist is applied to a bit cell of the magnetic recording layer and a non-zero write current is applied to the write coil to configure the magnetic recording layer into the first recording state (S1) or the second recording state (S2). A second non-zero energy assist is applied to a bit cell of the magnetic recording layer and the non-zero write current is applied to the write coil to configure the magnetic recording layer into the third recording state (S3), wherein the second non-zero energy assist is less than the first non-zero energy assist. The first non-zero energy assist is applied to the magnetic recording layer and a zero write current is applied to the write coil to configure a bit cell of the magnetic recording layer into the fourth recording state (S4).

In the example of FIG. 6, the magnetic recording layer may be erased by initially configuring the magnetic material of all the bit cells into the second recording state (S2). In one embodiment, a bit cell of the magnetic recording layer is configured into the first recording state (S1) by applying a negative write current to the write coil in order to orient the magnetic grains of all three magnetic materials into a negative polarity (represented by down arrows), and configured into the second recording state (S2) by applying a positive write current to the write coil in order to orient the magnetic grains of all three magnetic materials into a positive polarity (represented by up arrows). A bit cell of the magnetic recording layer is configured into the third recording state (S3) by reducing the energy assist such that only the first magnetic material is saturated by the magnetic field of the write coil while applying a negative write current to the write coil. In this manner, the magnetic grains of the first magnetic material orient into a negative polarity represented by down arrows while the magnet grains of the second magnetic material remain in the positive polarity (erased state) represented by up arrows. A bit cell of the magnetic recording layer is configured into the fourth recording state (S4) by applying the first non-zero energy assist to the magnetic recording layer and applying a zero write current to the write coil so that the magnetic grains of the first and second magnetic materials orient into a neutral polarity. In one embodiment, the relative volume of each magnetic material is configured such that there is a maximum separation in the read signal amplitudes between the adjacent recording states (S1) and (S3) and the adjacent recording states (S3) and (S4).

Figure 7A:
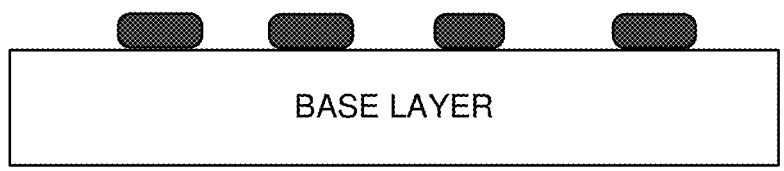
FIGS. 7A-7C show an embodiment wherein the multi-level recording layer is fabricated using a time-limited sputter process to apply different magnetic materials to a base layer.
Figure 7B:
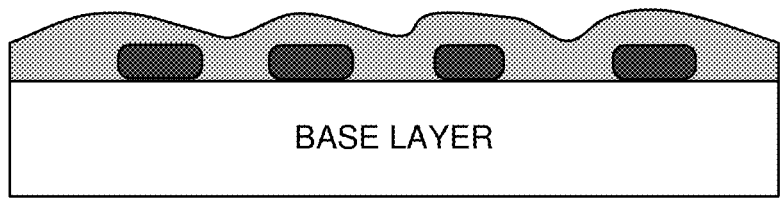
Figure 7C:
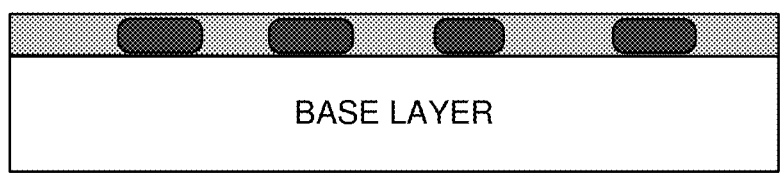

In the embodiments wherein the magnetic recording layer of the disk surface 16 comprises intermixed magnetic materials of varying coercivity, any suitable fabrication technique may be employed to manufacture the magnetic disk in order to achieve a sufficient homogenous mixture at the bit cell resolution. In one embodiment shown in FIG. 7A, a first magnetic material may be deposited to a base layer of the disk using a suitable sputtering process, after which a second magnetic material may be deposited to the base layer using the sputtering process. In one embodiment shown in FIG. 7C, after depositing the second magnetic material the disk surface 16 may be polished to form a smooth fly height surface for the head 18. In one embodiment, the relative volume ratio between each magnetic material may be controlled by time limiting the sputtering of each magnetic material. That is, the relative volume of any one magnetic material may be increased by increasing the sputtering time for the material relative to the sputtering time of the other materials. In another embodiment, the magnetic materials may be intermixed into a homogeneous mixture having a target ratio of relative volumes, and then the homogeneous mixture deposited onto the base layer of the disk using a suitable sputtering process. In yet another embodiment, the magnetic recording layer may be fabricated using a suitable patterned media process, such as by forming any suitable pattern (e.g., islands) comprising a first magnetic material, wherein the area between the pattern (e.g., islands) may comprise a second magnetic material.

Figure 8A:
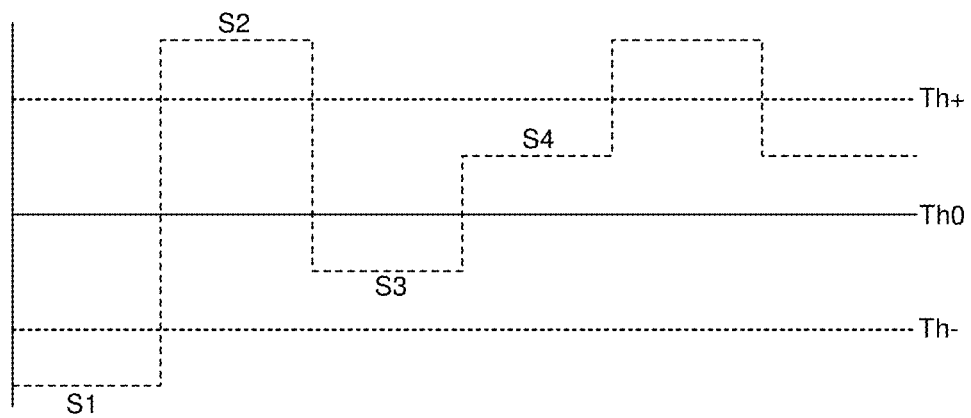
FIG. 8A shows an embodiment wherein the read signal is demodulated using a multi-threshold slicer.

FIG. 8A shows an embodiment wherein the magnetic recording layer is fabricated using three magnetic materials of varying coercivity in order to implement a quaternary recording system. In this embodiment, the relative volume of the magnetic materials is configured so as to maximize the difference in the amplitude of the read signal of adjacent recording states. When reading the recorded data, the read signal may be demodulated using a slicer having thresholds configured to detect the most likely recording state based on the amplitude of the read signal at each bit cell. In the example of FIG. 8A, the first recording state (S1) may be detected when the amplitude of the read signal exceeds the negative threshold Th−, the second recording state (S2) may be detected when the amplitude of the read signal exceeds a positive threshold Th+, the third recording state (S3) may be detected when the amplitude of the read signal is between a zero threshold Th0 and the negative threshold Th−, and the fourth recording state (S4) may be detected when the amplitude of the read signal is between the zero threshold Th0 and the positive threshold Th+.

In one embodiment, the thresholds of a slicer (e.g., the thresholds shown in FIG. 8A) may be calibrated to account for a deviation in the ratio of the magnetic materials from the target ratio. That is, in one embodiment the ratio of the magnetic materials may determine the amplitude of the read signal corresponding to each recording state, and therefore the thresholds of a slicer may be calibrated relative to the actual amplitude of the read signal corresponding to each recording state. In one embodiment, the slicer thresholds may be calibrated by writing a known test pattern to the magnetic recording layer, and then measuring the amplitude of the read signal while reading the known test pattern. In one embodiment, the slicer thresholds may be calibrated to target levels corresponding to the entire disk surface, and in another embodiment, the slicer thresholds may be calibrated to target levels corresponding to different zones across the disk surface. That is, in one embodiment the ratio of the magnetic materials may vary across the disk surface, and so the slicer thresholds may be calibrated to account for the variation.

Figure 8B:
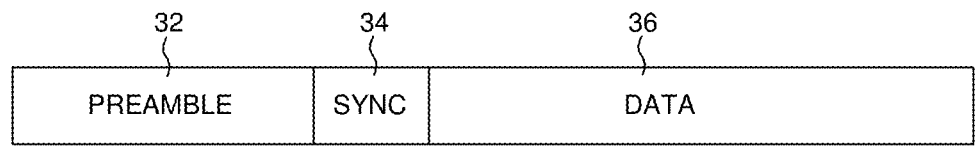
FIG. 8B shows an embodiment wherein the threshold levels of a slicer may be calibrated when reading a preamble and/or sync mark of a data sector and/or servo sector.

In another embodiment shown in FIG. 8B, each data sector and/or servo sector recorded to the disk may comprise a known preamble pattern 32 and a known sync mark 34 used to synchronize to a data field 36 during read operations. When reading the preamble 32 and/or sync mark 34, in one embodiment the slicer thresholds may be adjusted to account for variations in the read signal amplitude caused by a deviation in the ratio of the magnetic material. In this manner, the slicer thresholds may be adapted in real-time to variations in the ratio of the magnetic materials that may occur at a sector level resolution. In another embodiment, the slicer thresholds may be adjusted based on the saved amplitudes of the read signal after successfully reading a data sector or servo sector. In still another embodiment, the slicer thresholds may be adjusted as part of an error recovery procedure when a data sector is unrecoverable on-the-fly.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power large scale integrated (PLSI) circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, a hybrid disk drive comprising non-volatile semiconductor memory, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:
1. A data storage device comprising:
   a disk surface comprising a magnetic recording layer comprising a first magnetic material having a first coercivity intermixed with a second magnet material having a second coercivity higher than the first coercivity;

a head comprising a write coil configured to magnetize the magnetic recording layer in order to write data to the disk surface; and control circuitry configured to:
write the data to the disk surface by configuring the magnetic recording layer into one of at least three recording states;
read the data from the disk surface by reading the magnetic recording layer using the head to generate a multi-level read signal, where each level of the read signal corresponds to one of the recording states; and
detect the data from the multi-level read signal using an adjustable detector configured to account for a deviation in a ratio of the magnetic materials from a target ratio.

2. The data storage device as recited in claim 1, wherein the target ratio of the first magnetic material to the second magnetic material is approximately 1:1.

3. The data storage device as recited in claim 1, wherein the magnetic recording layer comprises a bit-patterned media composed of the first material.

4. The data storage device as recited in claim 1, wherein the control circuitry is further configured to write the data to the disk surface by applying an energy assist to the magnetic recording layer while applying a write current to the write coil.

5. The data storage device as recited in claim 4, wherein the control circuitry is further configured to:
write the data to the disk surface by configuring the magnetic recording layer into one of at least a first recording state, a second recording state, or a third recording state;
apply a first non-zero energy assist to the magnetic recording layer and apply a non-zero write current to the write coil to configure the magnetic recording layer into the first recording state or the second recording state; and
apply a second non-zero energy assist to the magnetic recording layer and apply the non-zero write current to the write coil to configure the magnetic recording layer into the third recording state, wherein the second non-zero energy assist is less than the first non-zero energy assist.

6. The data storage device as recited in claim 5, wherein the control circuitry is further configured to:
apply a first polarity non-zero write current to the write coil to configure the magnetic recording layer into the first recording state; and
apply a second polarity non-zero write current to the write coil to configure the magnetic recording layer into the second recording state, wherein the first polarity is opposite the second polarity.

7. The data storage device as recited in claim 5, wherein the control circuitry is further configured to:
write the data to the disk surface by configuring the magnetic recording layer into one of at least the first recording state, the second recording state, the third recording state, or a fourth recording state; and
apply the first non-zero energy assist to the magnetic recording layer and apply a zero write current to the write coil to configure the magnetic recording layer into the fourth recording state.

8. The data storage device as recited in claim 7, wherein the target ratio of the first magnetic material to the second magnetic material is within a range of 1.2:1 and 2:1.

9. The data storage device as recited in claim 7, wherein the fourth recording state corresponds to a substantially zero level of the read signal.

10. The data storage device as recited in claim 1, wherein:
the magnetic recording layer further comprises a third magnetic material having a third coercivity intermixed with the first magnetic material and the second magnet material, wherein the third coercivity is higher than the second coercivity; and
the control circuitry is further configured to write the data to the disk surface by configuring the magnetic recording layer into one of at least a first recording state, a second recording state, a third recording state, or a fourth recording state.

11. The data storage device as recited in claim 10, wherein the control circuitry is further configured to:
write the data to the disk surface by applying an energy assist to the magnetic recording layer while applying a write current to the write coil;
apply a first non-zero energy assist to the magnetic recording layer and apply a non-zero write current to the write coil to configure the magnetic recording layer into the first recording state or the second recording state;
apply a second non-zero energy assist to the magnetic recording layer and apply the non-zero write current to the write coil to configure the magnetic recording layer into the third recording state, wherein the second non-zero energy assist is less than the first non-zero energy assist; and
apply a third non-zero energy assist to the magnetic recording layer and apply the non-zero write current to the write coil to configure the magnetic recording layer into the fourth recording state, wherein the third non-zero energy assist is less than the second non-zero energy assist.

12. The data storage device as recited in claim 11, wherein the control circuitry is further configured to:
write the data to the disk surface by configuring the magnetic recording layer into one of at least the first recording state, the second recording state, the third recording state, the fourth recording state, or a fifth recording state; and
apply the first non-zero energy assist to the magnetic recording layer and apply a zero write current to the write coil to configure the magnetic recording layer into the fifth recording state.

13. A data storage device comprising:
a disk surface comprising a magnetic recording layer;
a head comprising a write coil and an energy assist element configured to generate an energy assist during write operations; and
control circuitry configured to:
write data to the disk surface by configuring the magnetic recording layer into one of at least a first recording state, a second recording state, or a third recording state;
apply a non-zero energy assist to the magnetic recording layer and apply a non-zero write current to the write coil to configure the magnetic recording layer into the first recording state or the second recording state; and
apply the non-zero energy assist to the magnetic recording layer and apply a zero write current to the write coil to configure the magnetic recording layer into the third recording state.

14. The data storage device as recited in claim 13, wherein the control circuitry is further configured to:
- apply a first polarity non-zero write current to the write coil to configure the magnetic recording layer into the first recording state; and
- apply a second polarity non-zero write current to the write coil to configure the magnetic recording layer into the second recording state, wherein the first polarity is opposite the second polarity.

15. The data storage device as recited in claim 13, wherein the control circuitry is further configured to:
- read the data from the disk surface by reading the magnetic recording layer using the head to generate a multi-level read signal, where each level of the read signal corresponds to one of the recording states; and
- the third recording state corresponds to a substantially zero level of the read signal.

16. A data storage device comprising:
- a disk surface comprising a magnetic recording layer comprising a first magnetic material having a first coercivity intermixed with a second magnet material having a second coercivity higher than the first coercivity;
- a means for writing data to the disk surface by configuring the magnetic recording layer into one of at least three recording states;
- a means for reading the data from the disk surface by reading the magnetic recording layer to generate a multi-level read signal, where each level of the read signal corresponds to one of the recording states; and
- a means for detecting the data from the multi-level read signal by accounting for a deviation in a ratio of the magnetic materials from a target ratio.

17. The data storage device as recited in claim 16, wherein the target ratio of the first magnetic material to the second magnetic material is approximately 1:1.

18. The data storage device as recited in claim 16, wherein the magnetic recording layer comprises a bit-patterned media composed of the first material.

19. The data storage device as recited in claim 16, further comprising a means for writing the data to the disk surface by configuring the magnetic recording layer into one of at least a first recording state, a second recording state, or a third recording state.

20. The data storage device as recited in claim 16, further comprising a means for writing the data to the disk surface by configuring the magnetic recording layer into one of at least a first recording state, a second recording state, a third recording state, or a fourth recording state.

21. The data storage device as recited in claim 1, wherein the adjustable detector comprises a slicer comprising adjustable thresholds.

\* \* \* \* \*